(12) United States Patent
Bennett

(10) Patent No.: US 10,653,210 B2
(45) Date of Patent: May 19, 2020

(54) CUSTOMIZABLE LAPEL PIN COMMUNICATION DEVICE

(71) Applicant: Roberts Bennett, Travelers Rest, SC (US)

(72) Inventor: Roberts Bennett, Travelers Rest, SC (US)

( * ) Notice: Subject to any disclaimer, the term of this patent is extended or adjusted under 35 U.S.C. 154(b) by 0 days.

(21) Appl. No.: 16/007,211

(22) Filed: Jun. 13, 2018

(65) Prior Publication Data

US 2018/0360168 A1     Dec. 20, 2018

Related U.S. Application Data

(60) Provisional application No. 62/522,450, filed on Jun. 20, 2017.

(51) Int. Cl.

| | |
|---|---|
| *A44B 9/16* | (2006.01) |
| *H04M 1/02* | (2006.01) |
| *H04N 5/225* | (2006.01) |
| *A44C 1/00* | (2006.01) |
| *H04R 1/02* | (2006.01) |

(52) U.S. Cl.
CPC ............. *A44B 9/16* (2013.01); *H04M 1/0283* (2013.01); *H04N 5/2252* (2013.01); *H04N 5/2257* (2013.01); *A44C 1/00* (2013.01); *H04R 1/028* (2013.01); *H04R 2420/07* (2013.01)

(58) Field of Classification Search
CPC ..... A44B 9/16; H04M 1/0283; H04N 5/2257; H04N 5/2252
See application file for complete search history.

(56) References Cited

U.S. PATENT DOCUMENTS

| | | | | |
|---|---|---|---|---|
| 5,147,129 | A * | 9/1992 | Ku | B42D 15/022 |
| | | | | 362/106 |
| 2008/0204273 | A1* | 8/2008 | Crystal | H04H 60/58 |
| | | | | 340/870.3 |
| 2014/0270685 | A1* | 9/2014 | Letke | A42B 1/244 |
| | | | | 386/224 |

\* cited by examiner

*Primary Examiner* — Ahmed A Berhan
(74) *Attorney, Agent, or Firm* — Perkins Law Firm; John R. Perkins, Jr.

(57) ABSTRACT

The present invention provides a customizable lapel pin featuring a detachable or swappable face covering for easy customization, all designed to cover a micro communication device for recording and transmitting audio and video. The recording device may be charged by wired connection or wireless inductive charging. Data connection is also by wired micro USB connection or wireless transceiver, which could provide a Bluetooth, Wi-Fi, or cellular connection.

9 Claims, 14 Drawing Sheets

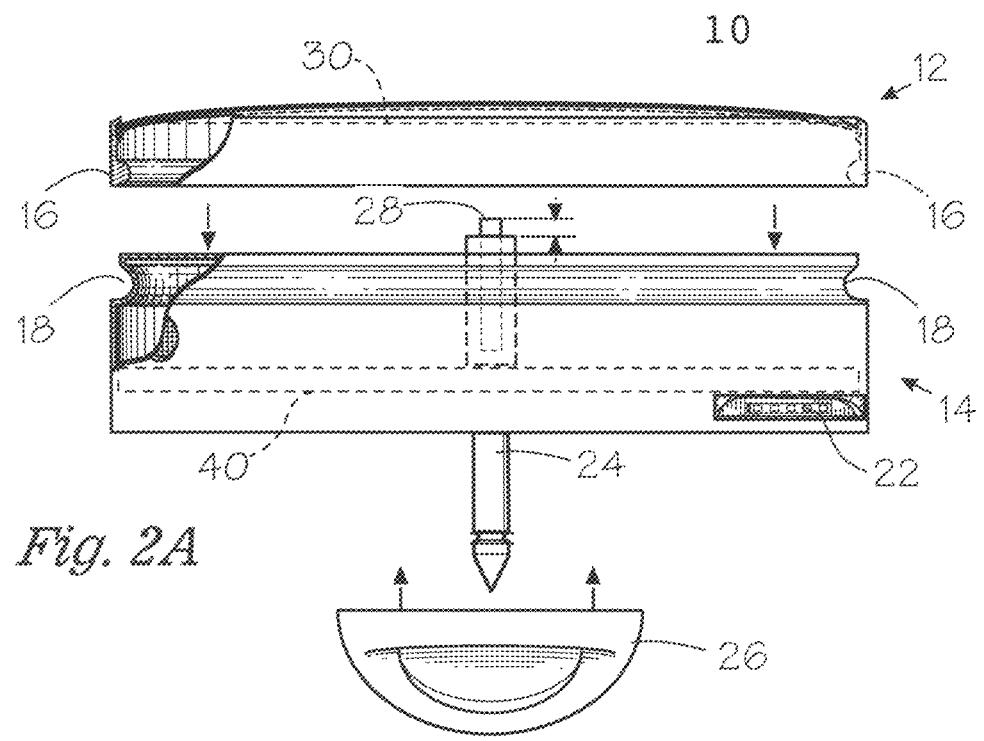
Fig. 2A
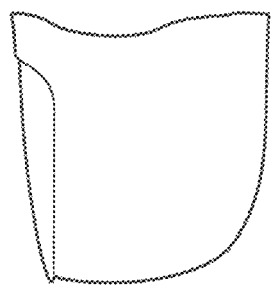
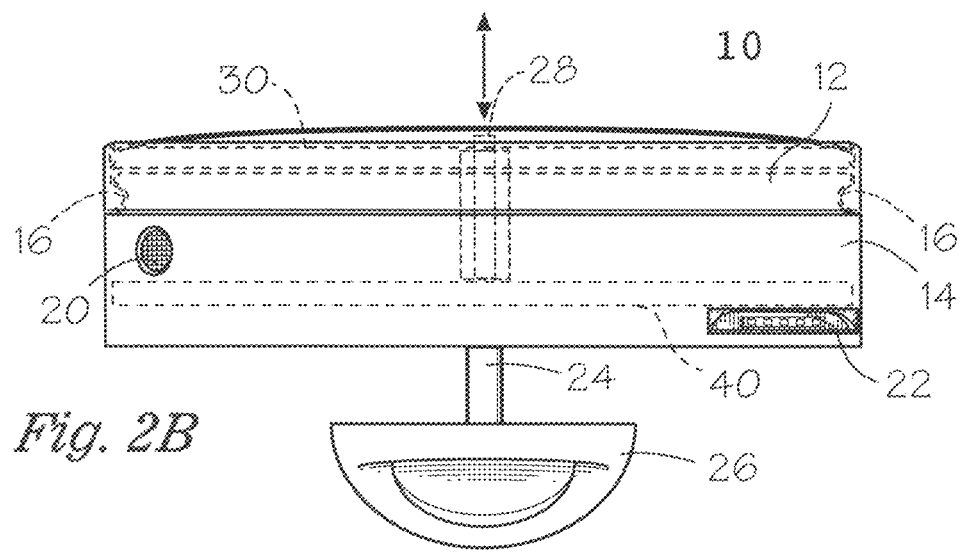
Fig. 2B

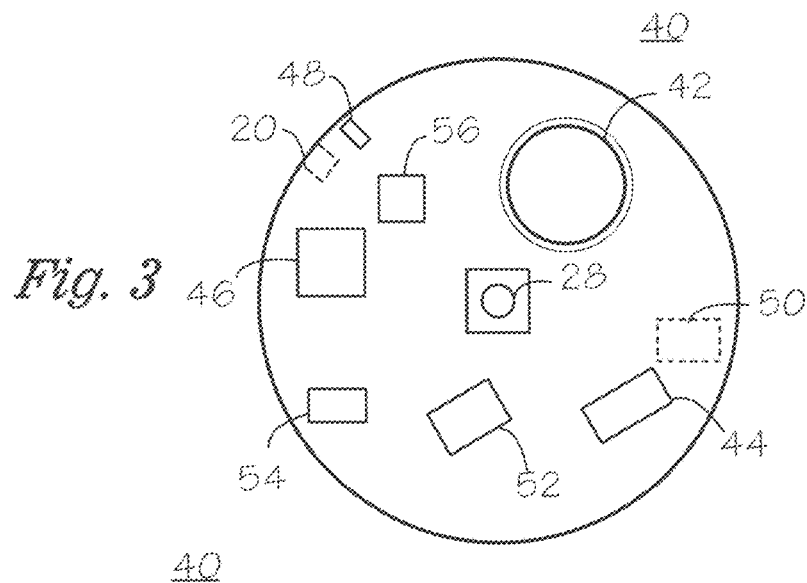
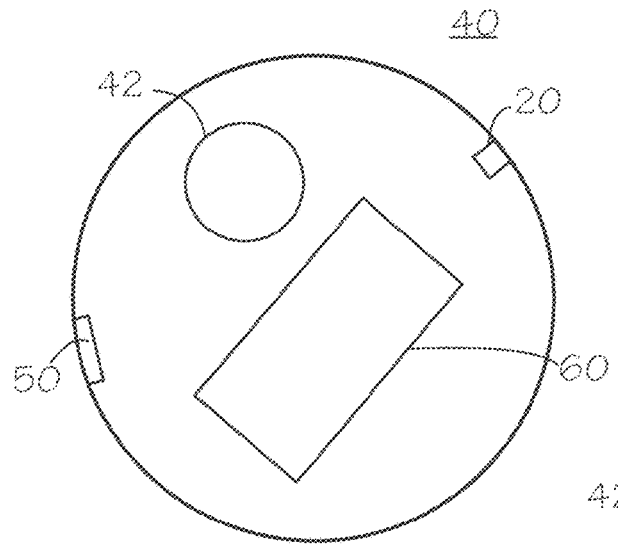
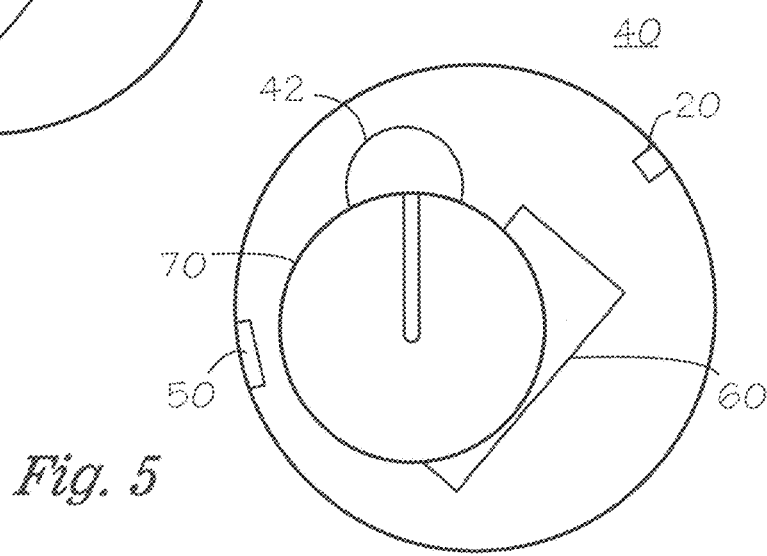

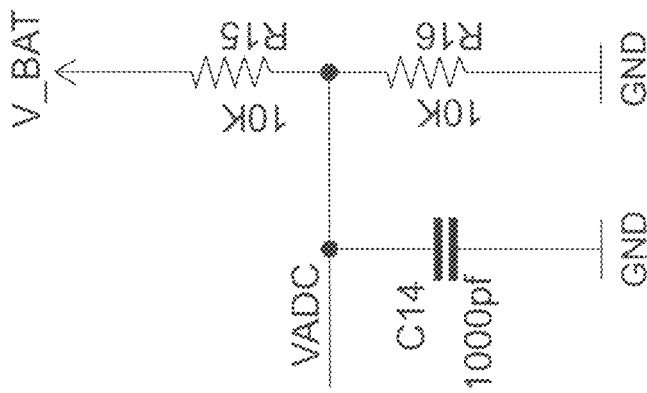
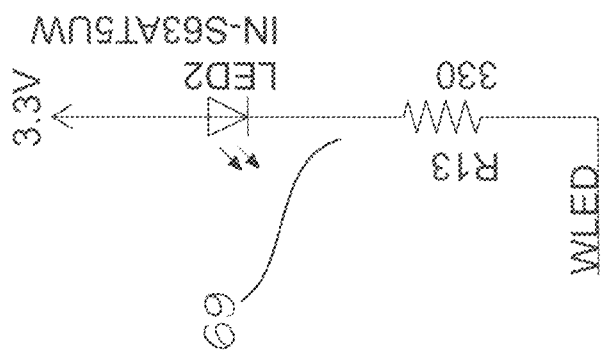
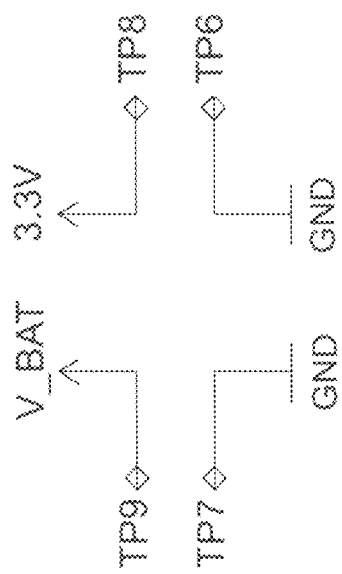
Fig. 7I

CUSTOMIZABLE LAPEL PIN COMMUNICATION DEVICE

FIELD OF THE INVENTION

The present invention generally relates to customizable lapel pins and, more particularly, to a lapel pin that features a swappable face covering for easy customization, all designed to cover a micro communication device for recording and transmitting audio and video.

BACKGROUND OF THE INVENTION

Prior art micro communication devices are generally limited to Bluetooth® earpieces that many dislike wearing, thus limiting their utility in most applications. In addition, most prior art micro communication devices tend to be less than sturdy, often failing with mild impact and exposure to moisture.

What is needed is a micro communication device that is more durable, more wearable, and less noticeable even when placed out on open display when in use. Such a device also needs to be sturdier so as to suffer impact and moisture exposure without failure. The device also needs to present a customizable face to allow its use in multiple situations while still aesthetically pleasing. And finally, the device needs to provide a wired and wireless connection means for easily recharging its battery and for data upload and download.

Groups at conferences or other gatherings often wish to identify themselves within a group. A common lapel pin is often used by the group to identity members at a glance.

Individuals in such a group also need to communicate and often have no means other than to use a smart phone or other handheld communication device. A lapel pin that is customized with a common appearance for each member of a group can also provide public or private communication for members within that group.

An object of the present invention is to provide a swappable cover on a lapel pin so that it may be worn by members of a group in a variety of situations appropriate to the group's identifiers and surroundings.

Another object of the present invention is to provide a lapel pin micro communication device that may be worn in commonly expected situations while still aesthetically pleasing.

A further object of the present invention is to provide a swappable cover on the lapel pin so that it may be worn in a variety of situations appropriate to the user's surroundings.

A further object of the present invention is to provide such a device enclosed in a sturdy housing designed to withstand impact and moisture.

A further object of the present invention is to provide a micro communication device with one or both of a wired connection means for recharging its internal battery and a wireless connection means for inductively charging the battery.

And yet another object of the present invention is to provide a micro communication device with both a wired and wireless connection means for data upload and download.

SUMMARY OF THE INVENTION

The present invention accomplishes the foregoing object by providing a swappable fees lapel pin containing a micro communication device. The device can be used as a stand-alone communication device or as a peripheral that connects to other communication devices such as a cellular phone.

The lapel pin comprises a swappable cover on the lapel pin so that it may be worn in a variety of situations appropriate to the user's surroundings. The lapel pin further comprises a sturdy housing designed to withstand impact and moisture, where the housing further comprises a micro communication device for communication audio and video.

In one aspect of the invention, the micro communication device comprises one or both of a wired connection means for recharging its internal battery and a wireless connection means for inductively charging the battery.

In another aspect of the invention, the micro communication device comprises both a wired and wireless connection means for data upload and download.

More specifically, the invention provides a customizable lapel pin comprising: a housing comprising therein: a microphone; a speaker; a power source; and a controller for receiving audio from said microphone and transmitting audio to said speaker; a slideably engageable outer cover for use both as a lapel pin cover and as a power control activation for said audio controller, wherein said outer cover is capable of receiving and displaying a swappable customized image; and a connection element for use in connecting the lapel pin to a surface.

The customizable lapel pin may also comprise a USB connection for charging said power source, a USB connection for sending and receiving data to and from an external source, a wireless controller for receiving data associated with said audio from said microphone and for sending data associated with said audio transmitted to said speaker.

The customizable lapel pin may also comprise a wireless controller for receiving data to amend the internal software embedded in one or more components of said customizable lapel pin. The wireless controller can be a Bluetooth controller, a Wi-Fi controller, a cellular controller, or another form of wireless controller suited to the specific purpose of various embodiments of the invention.

The customizable lapel pin can also include a video recorder.

In one embodiment, the connection element may be a pin. In another embodiment, the connection element may be two separate connection elements, which together may provide (a) a means to connect the housing to a surface, and/or (b) a means to transmit power from an external power source to the lapel pin.

The invention also provides a method of using a customizable lapel pin communication device, said method comprising the steps of: providing a lapel pin housing comprising therein: a microphone; a speaker; a power source; a power switch; and a controller for receiving audio from said microphone and transmitting audio to said speaker; providing a lapel pin cover comprising therein a customized image, wherein said lapel pin cover is sized to fit snugly over said lapel pin housing; affixing said lapel pin cover over said lapel pin housing to join the two into a single lapel pin; affixing said lapel pin to a surface; pressing the outer portion of said lapel pin cover to engage said power switch; receiving audio from said microphone; and transmitting said audio to an external receiver.

The method of using a customizable lapel pin communication device may also comprise the step of receiving audio data from an external receiver and playing said audio data on said speaker. It may also include the step of attaching a charger to said customizable lapel pin communication device to charge said power source. The method may include the step of attaching a USB cable to said customizable lapel pin communication device to transmit data to said customizable lapel pin communication device.

Optionally, the method of using a customizable lapel pin communication device may comprise the step of attaching a USB cable to said customizable lapel pin communication device to receive data from said customizable lapel pin communication device. Or the method may comprise the step of providing a lapel pin housing further comprising therein a video recorder.

In one embodiment of this method, the connection element may be a pin. In another embodiment of the method, the connection element may be two separate connection elements, which together may provide (a) a means to connect the housing to a surface, and/or (b) a means to transmit power from an external power source to the lapel pin.

DESCRIPTION OF THE DRAWINGS

The invention will be more readily understood with reference to the following specification in conjunction with the drawings herein.

FIG. 2A is a side view of a customizable lapel pin containing a micro communication device according to a preferred embodiment of the invention, with the cover and clasp removed.

FIG. 2B is a side view of a customizable lapel pin containing a micro communication device according to a preferred embodiment of the invention, with the cover and clasp engaged.

FIG. 3 is an internal isometric view of one side of a circuit board for use in a customizable lapel pin containing a micro communication device according to a preferred embodiment of the invention.

FIG. 4 is an internal isometric view of another side of a circuit board for use in a customizable lapel pin containing a micro communication device according to a preferred embodiment of the invention, without a battery.

FIG. 5 is an internal isometric view of another side of a circuit board for use in a customizable lapel pin containing a micro communication device according to a preferred embodiment of the invention, where a battery is included.

FIG. 7I is a circuit line diagram to illustrate a portion of the internal electronic components and connections in a customizable lapel pin containing a micro communication device according to a preferred embodiment of the invention.

DESCRIPTION OF THE PREFERRED EMBODIMENTS

Figure 1:
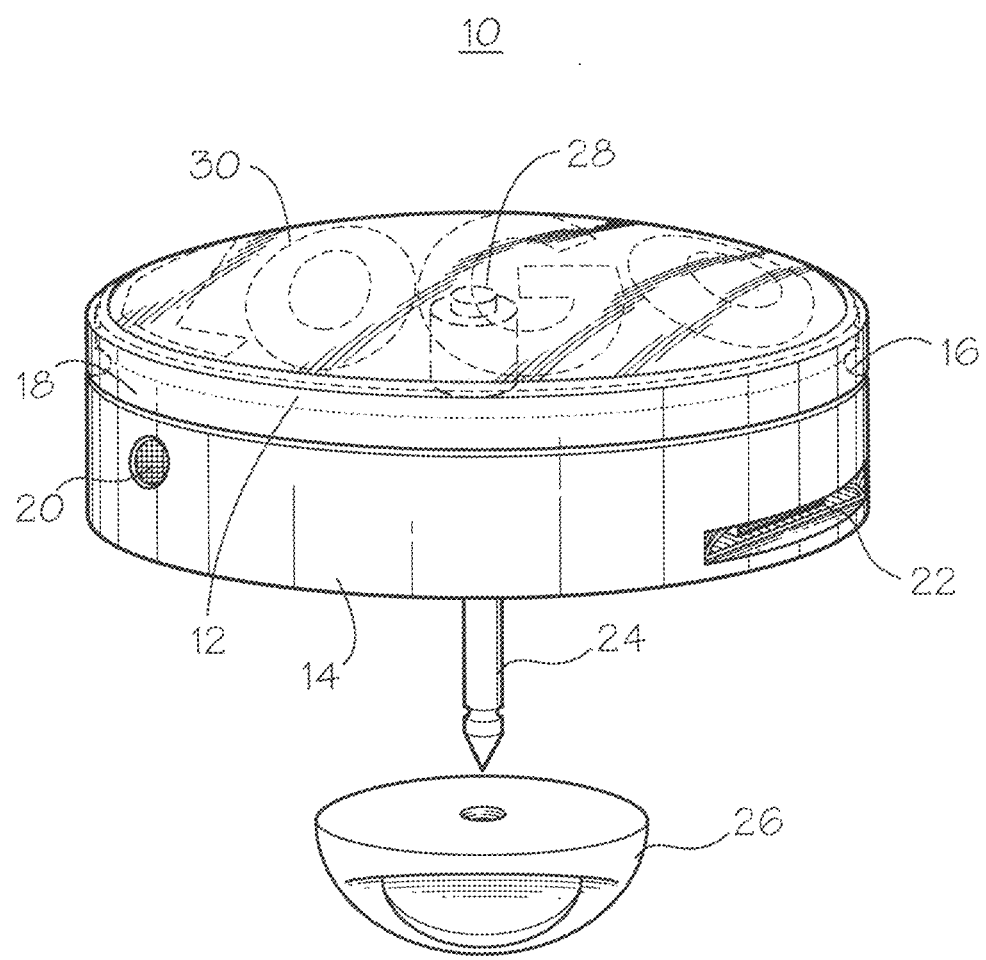
FIG. 1 is a perspective view of a customizable lapel pin containing a micro communication device according to a preferred embodiment of the invention.

Referring now to FIG. 1, a customizable lapel pin 10 is illustrated for providing a micro communication device according to a preferred embodiment of the invention. Lapel pin 10 is shown fully assembled in FIG. 1. Detachable cover 12 is snapped into place onto housing 14 by pressing downward to engage the lip 16 of cover 12 into recess 18 of housing 14. Recess 18 runs the entire outer circumference of housing 14 in this embodiment, and lip 16 likewise runs the entire inner circumference of cover 12.

Microphone 20 is visible on the exterior of housing 14, as is USB charger and data port 22. Switch 28 is shown under cover 12 and not outwardly visible in FIG. 1. Logo 30 is outwardly visible, but not as clear at this viewing angle. It is typically placed below the surface of cover 12 to be outwardly visible.

As this is a lapel pin, the actual pin 24 is visible as the connection element, along with clasp 26. Pin 24 and clasp 26 are used together to attach lapel pin 10 to a surface, which is typically an article of clothing but can be any surface capable of receiving pin 24.

In some embodiments of lapel pin 10, it may be preferable to place a rubber gasket (not shown) around recess 18 to provide additional protection against moisture and debris entering the device.

Referring now to FIG. 2A, lapel pin 10 is shown with cover 12 and clasp 26 removed. In a preferred embodiment, cover 12 is made of clear flexible materials, such as acrylic or Plexiglas, so that cover 12 can be pressed onto the surface of housing 14. In typical use of this embodiment, a user removes cover 12 and then places a logo 30 or other visible means inside the upper surface of cover 12, so that logo 30 would be outwardly visible through cover 12. Once logo 30 is placed inside cover 12, the user would then press cover 12 downward onto the upper surface of housing 14 to engage lip 16 with recess 18 around the circumference of housing 14. With the proper dimensions and flexibility of cover 12, lip 16 should snap into place over recess 18 to hold cover 12 firmly in place.

Once attached as shown in FIG. 2B, the outer surface of cover 12 would then contact switch 28 to provide a mechanism for power up and power down of lapel pin 10. As cover 12 is preferably made of clear flexible material in this embodiment, a user would simply press the outer portion of cover 12, which would then deflect Inward to press down on switch 28 for activation and control of lapel pin 10. In this embodiment, switch 28 is used for many purposes, including at least to (a) switch lapel pin 10 on and off, (b) switch modes, (c) Bluetooth® pairing, and (d) cancel pairing.

As described with reference to FIG. 1, pin 24 is pressed into a surface for normal use. When the surface used is a thin surface such as an article of clothing, clasp 26 is preferably attached to pin 24 to hold lapel pin 10 in place for use.

In other embodiments, all of cover 12, rather than merely the outer surface portion, may be movable up and down to activate switch 28. In such an embodiment, a spring (not shown) may be included to provide upward pressure and resistance against pressing down on cover 12. In either embodiment, these configurations provide lapel pin 10 improved shock resistance to make it more durable.

In yet another embodiment, a camera (not pictured) is also provided within housing 14 so that images outside cover 12 can be monitored, recorded, and transmitted.

FIG. 3 illustrates some of the internal components of lapel pin 10 from a top view of circuit board 40. Here speaker 42 occupies a significant portion of board 40 in this embodiment. Other embodiments might include a different type of speaker, which could also be larger or smaller as desired.

Integrated circuit (IC) 44 provides a variety of controls for lapel pin 10. In this embodiment, IC 44 manages the sequence for "waking up" the device from sleep mode. IC 44 also provides the audio amplifier that feeds speaker 42.

IC 46 is a microcontroller that controls multiple functions in the device. In this embodiment, IC 46 manages power use in the device via embedded software. It also manages the output of LED 48 to provide a variety of indications for using, observing and controlling lapel pin 10. Typical indications from LED 48 are (a) on, (b) switching off (c) unpaired, (d) paired, (e) pairing, (f) charging, and (g) charged. All of these indications are selected via embedded software within IC 46.

The power input into USB plug insert 50 (not visible as it is on other side of board 40) is controlled by USB power controller 52. Controller 52 works in conjunction with voltage regulator 54 to ensure that the voltage used in this preferred embodiment is regulated at 3.3 VDC. That is important because USB voltage inputs vary from 3 to 5 VDC. It is also important in this embodiment because each of the illustrated ICs optimally operate on 3.3 VDC.

Microphone controller 56 works with microphone 20 to control the audio input into the Bluetooth® IC (discussed below). Switch 28 is also illustrated as pointing directly upwards when board 40 is viewed from this angle.

FIG. 4 illustrates the reverse side view of board 40. Here, speaker 42 is still visible because it passes all the way from one side to the other of board 40. USB input 50 is now visible. USB input 50 is designed in this embodiment to receive a micro USB connector for both charging lapel pin 10 and data transfer to and from lapel pin 10. Microphone 20 is also visible from this angle as the input source for voice and other sounds into lapel pin 10.

The large IC 60 shown is a Bluetooth® microcontroller. This IC can be selected from any number of off-the-shelf Bluetooth® controllers and in this embodiment is a BC127 from Sierra Wireless. IC 60 provides many of the data and communications capabilities of lapel pin 10. In this embodiment, IC 60 provides for Bluetooth® connectivity between lapel pin 10 and another peripheral device, such as a smart phone.

In other embodiments, IC 60 may provide Wi-Fi internet connectivity to connect lapel pin 10 to a local area or wide area network. In yet another embodiment, IC 60 could be replaced with a standard cellular connectivity IC so that lapel pin 10 could be used to connect to a cellular network.

FIG. 5 illustrates circuit board 40 with a battery 70 now installed as the power source. The choice of battery 70 is easily configurable to accommodate size and power requirements. A lithium ion rechargeable LR2032 battery is used in this embodiment. The device is charged using USB plug insert 50, controlled by USB power controller 52. In another embodiment, an inductive charging coil (not pictured) can be included m housing 14 to provide inductive charging to power source 70.

USB plug insert 50 and the Bluetooth controller also allows data transfer to and from the device for programming, updates, and the like. USB plug 50 provides a mechanism for wired data transfer, whereas Bluetooth controller 60 provides a mechanism for wireless data transfer.

Figure 6:
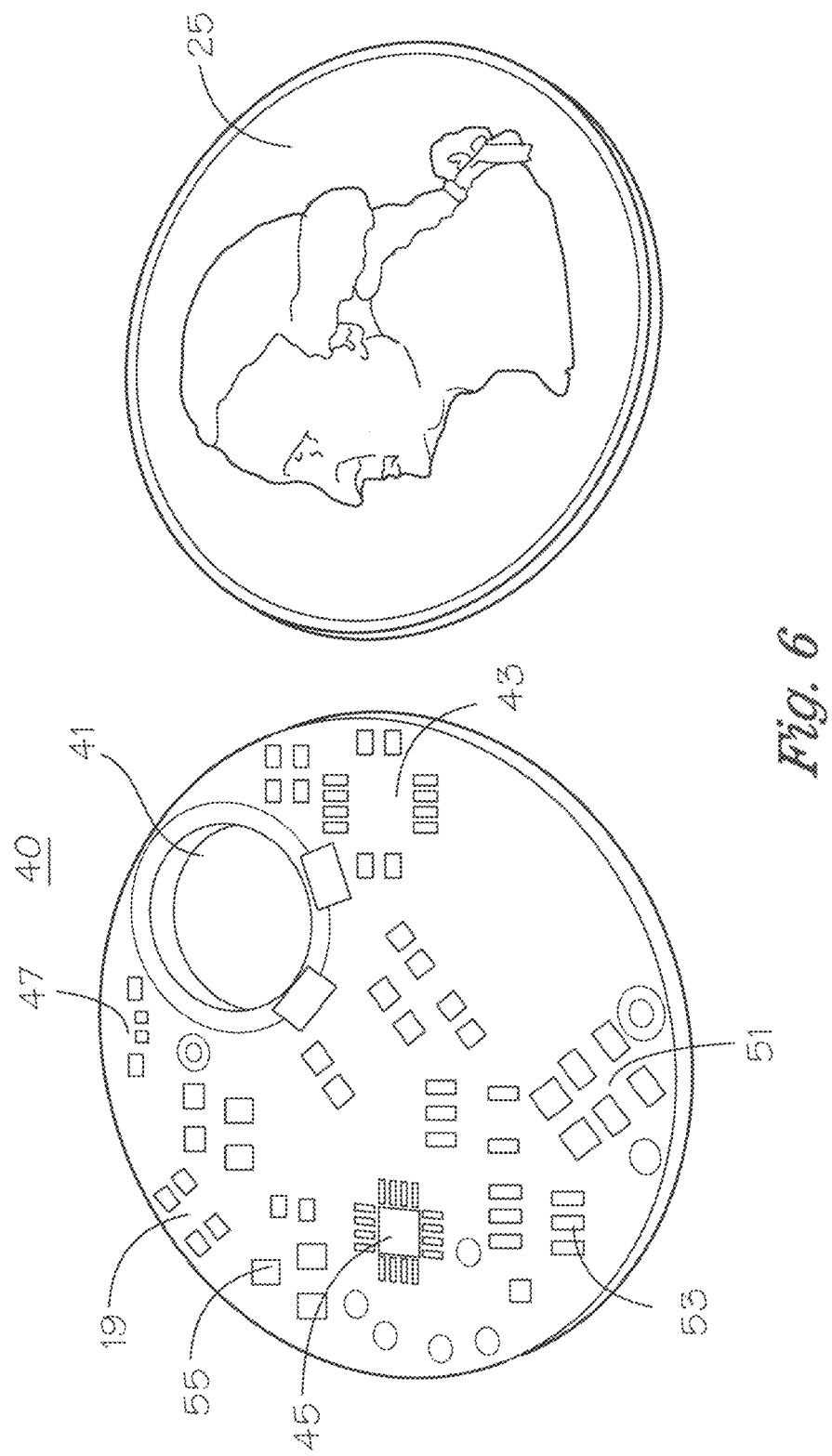
FIG. 6 is an isometric view of a circuit board for use in a customizable lapel pin containing a micro communication device according to a preferred embodiment of the invention, where the electronic components have not yet been added and size is illustrated as comparable to the size of a U.S. quarter.

FIG. 6 illustrates printed circuit board 40 without the various IC and other electronic components installed. From this illustration, one can see that this embodiment of board 40 is the approximate size of a United States quarter 25. In this figure, the opening 41 for speaker 42 is shown, along with the slots for the other components. Slot 43 is present to accept IC 44. Slot 51 is present to accept USB power controller 52. Slot 53 is present to accept voltage regulator 54. Slot 45 is present to accept IC 46. Slot 55 is present to accept Microphone controller 56. Slot 19 is present to accept microphone 20. Slot 47 is present to accept LED 48.

FIGS. 7A to 7I provide a more detailed set of schematic diagrams to show the internal connections of the various electronic components discussed in the foregoing figures.

Figure 7A:
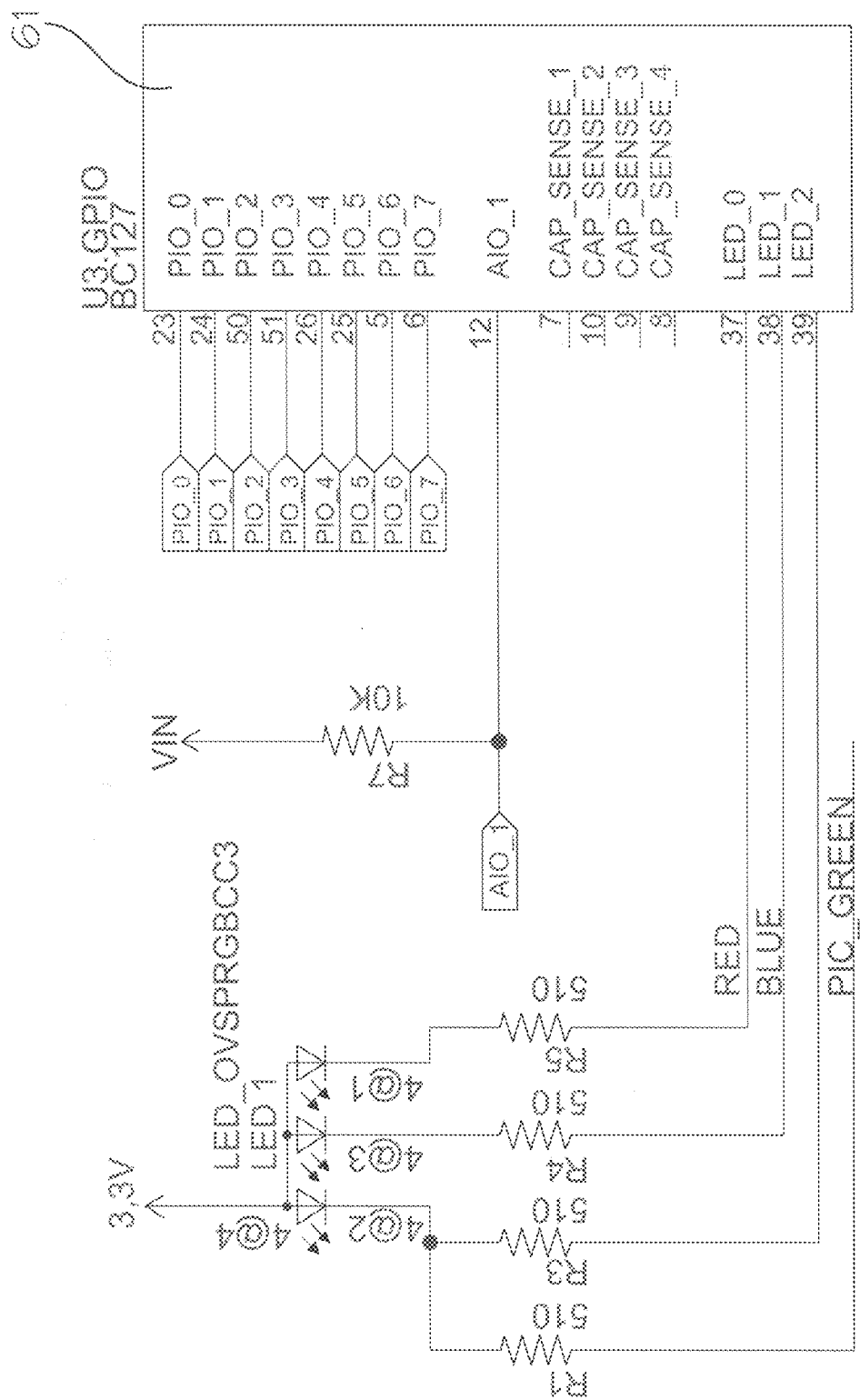
FIG. 7A is a circuit line diagram to illustrate a portion of the internal electronic components and connections in a customizable lapel pin containing a micro communication device according to a preferred embodiment of the invention.

FIG. 7A illustrates a schematic for an embodiment of the circuits connecting the Bluetooth® module, microcontroller IC 60. This is the same IC 60 illustrated in FIGS. 4 and 5 but here is broken out into multiple provisions to show its functionality in more detail.

It is important to understand that IC 60 is comprised of multiple sections with multiple functionalities. Here in FIG. 7A, an LED management portion 61 is illustrated as the controller for the output of LED 48 from FIG. 3. In this embodiment, and as shown in FIG. 7A, the Bluetooth® module contains LED, GPIO and battery monitoring, along with battery temperature sensing input and LED status indicators.

Figure 7B:
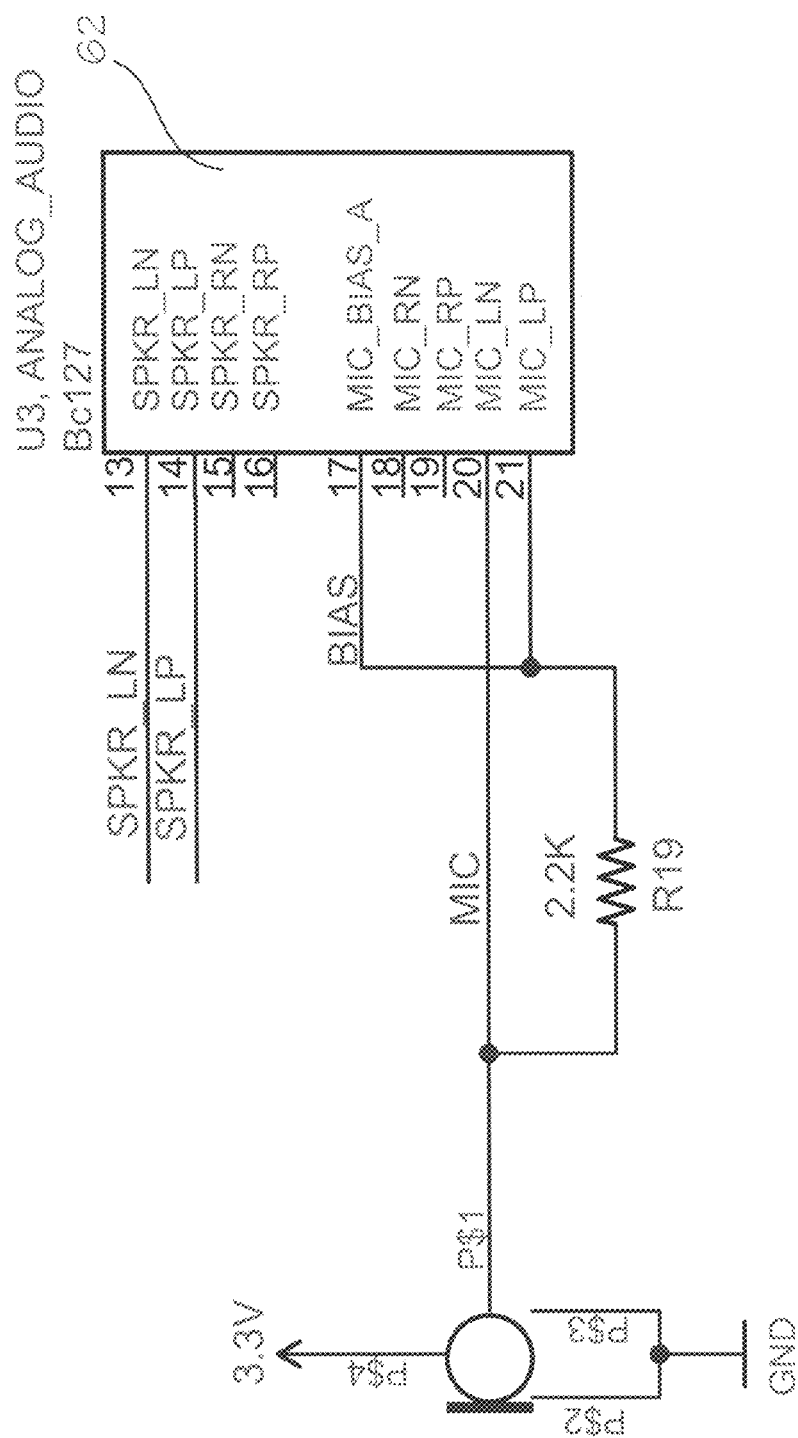
FIG. 7B is a circuit line diagram to illustrate a portion of the Internal electronic components and connections in a customizable lapel pin containing a micro communication device according to a preferred embodiment of the invention.
Figure 7C:
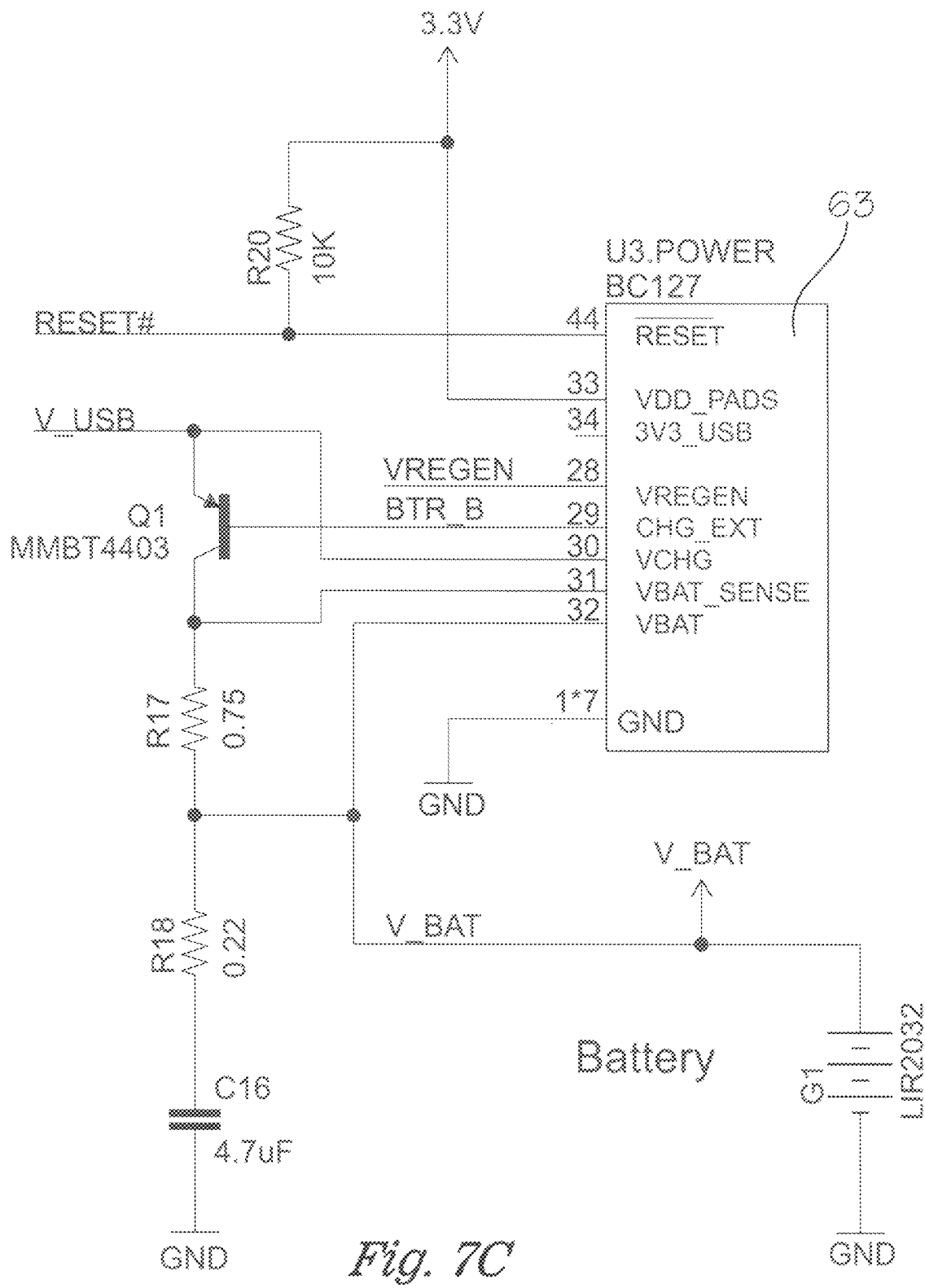
FIG. 7C is a circuit line diagram to illustrate a portion of the internal electronic components and connections in a customizable lapel pin containing a micro communication device according to a preferred embodiment of the invention.

IC 60 is also comprised of microphone bias controller 62 that controls the audio subsection and microphone input, and speaker output as shown in FIG. 7B. IC 60 is further comprised of a battery charge management portion 63 as shown in FIG. 7C, which controls the charging of battery 70 illustrated in FIG. 5, along with USB power input.

Figure 7D:
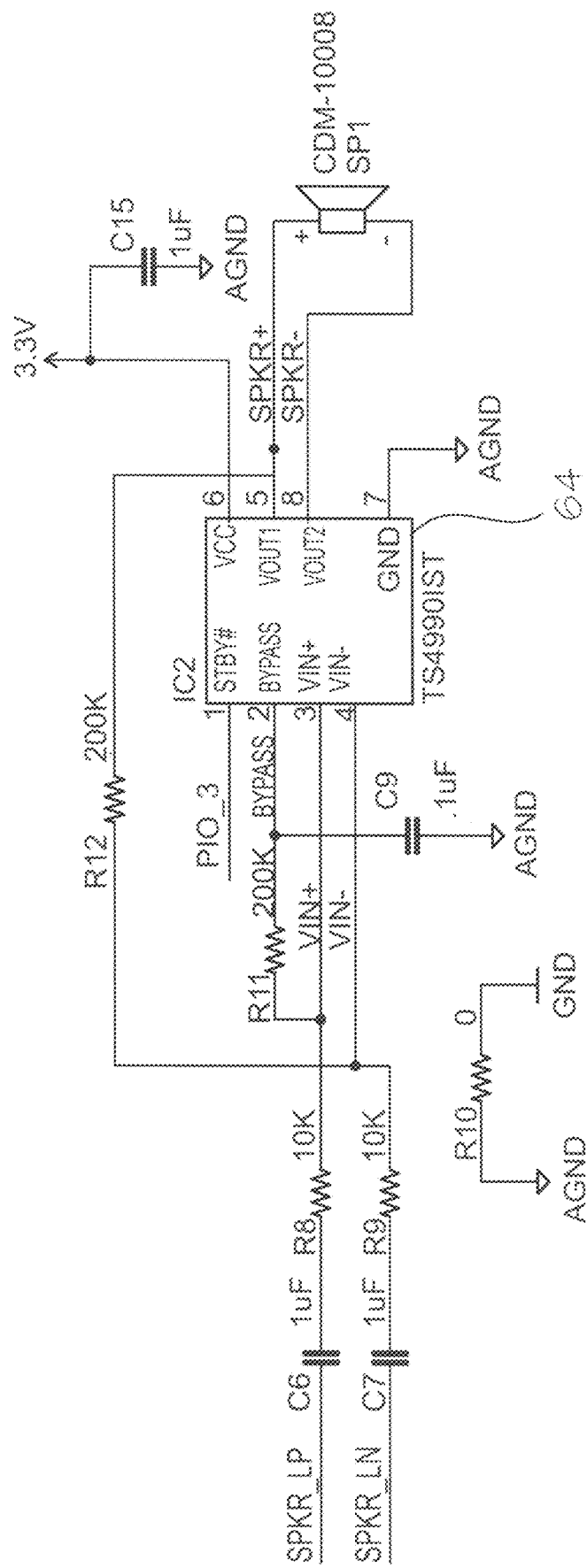
FIG. 7D is a circuit line diagram to illustrate a portion of the internal electronic components and connections in a customizable lapel pin containing a micro communication device according to a preferred embodiment of the invention.
Figure 7E:
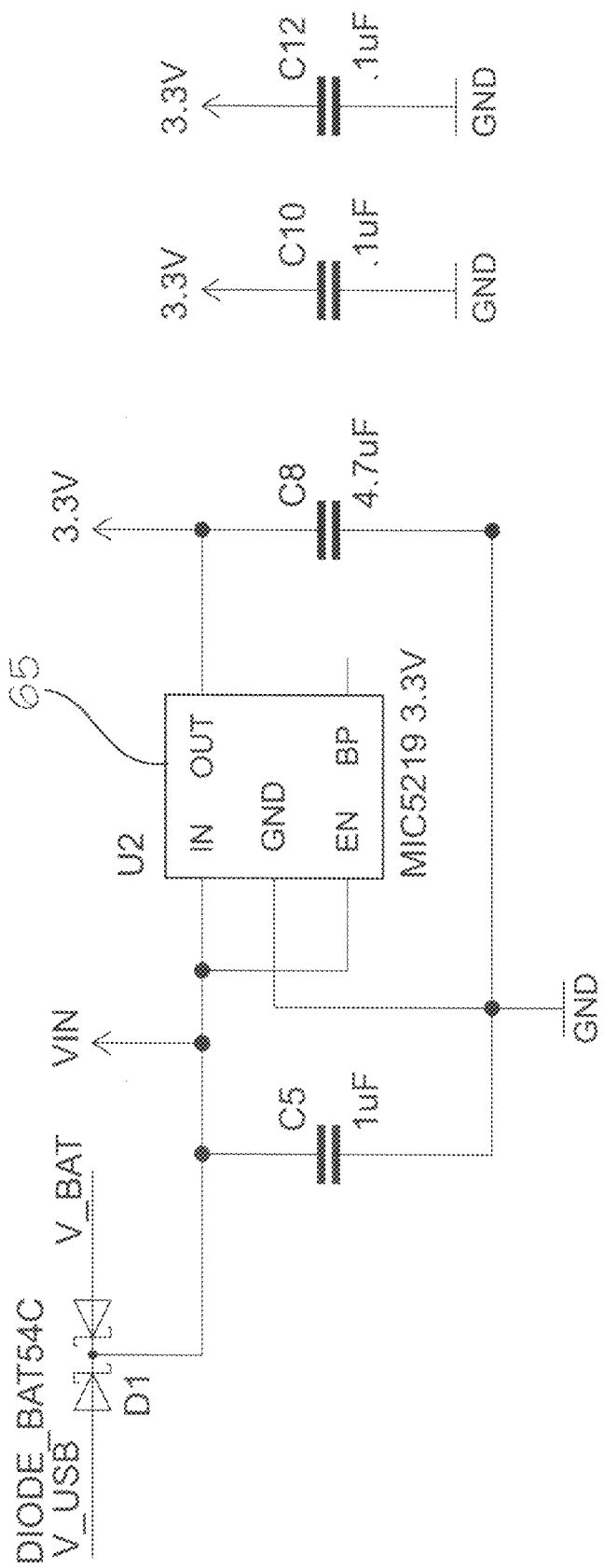
FIG. 7E is a circuit line diagram to illustrate a portion of the internal electronic components and connections in a customizable lapel pin containing a micro communication device according to a preferred embodiment of the invention.

FIG. 7D illustrates a schematic diagram for audio amplifier portion 64 comprised within IC 44 to feed speaker 42 shown in FIGS. 3 and 4. FIG. 7E illustrates voltage regulator controller 65 that operates with voltage regulator IC 54 shown in FIG. 3.

Figure 7F:
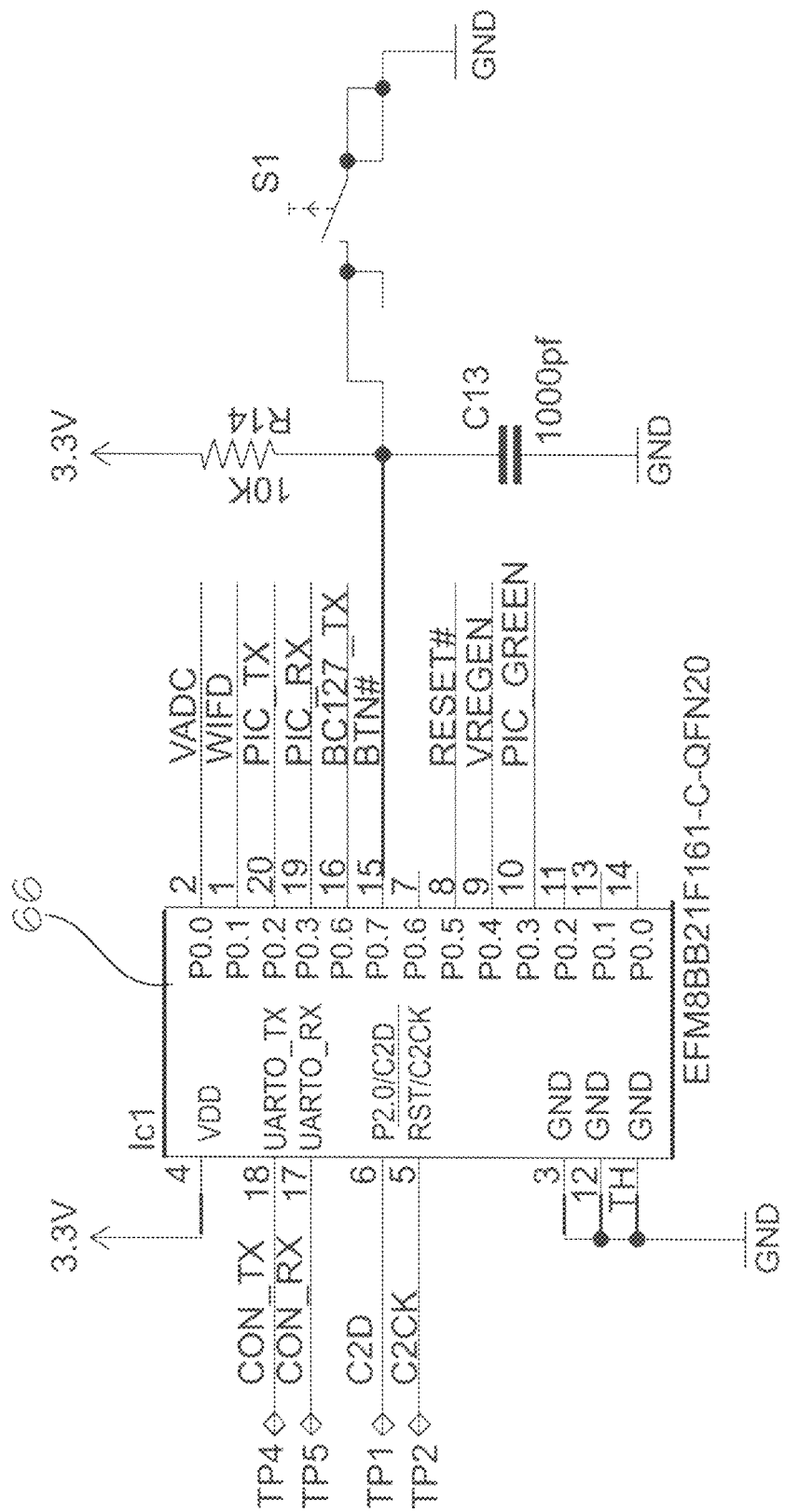
FIG. 7F is a circuit line diagram to illustrate a portion of the internal electronic components and connections in a customizable lapel pin containing a micro communication device according to a preferred embodiment of the invention.
Figure 7G:
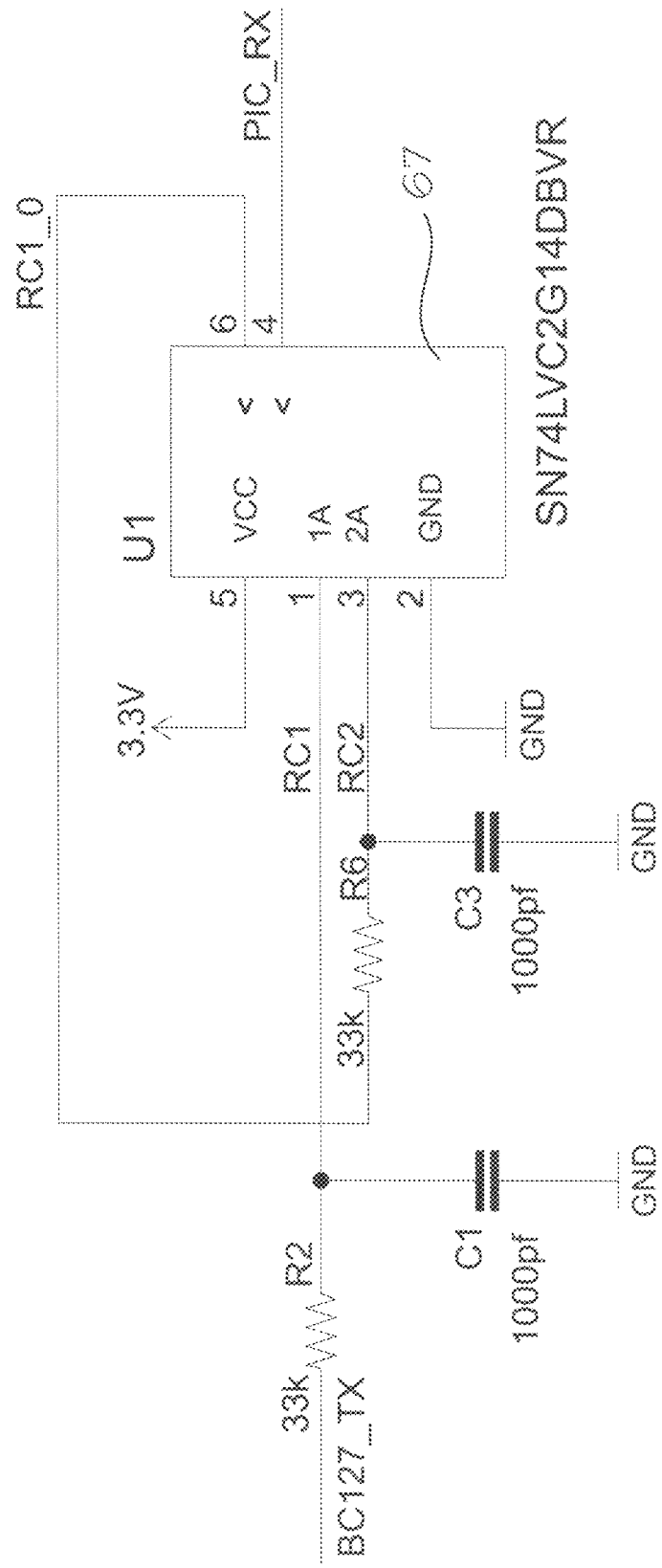
FIG. 7G is a circuit line diagram to illustrate a portion of the internal electronic components and connections in a customizable lapel pin containing a micro communication device according to a preferred embodiment of the invention.

As shown in FIG. 7F, microcontroller 66 and related circuitry is another portion of IC 46 shown in FIG. 3 that provides system management and manages power use in lapel pin 10 via embedded software. Microcontroller 67 and related circuitry in FIG. 7G is another portion of IC 44 that manages the wakeup sequence for sleep mode. In this embodiment, 7G illustrates a dual Schmidt trigger inverter and serial communications converter.

Figure 7H:
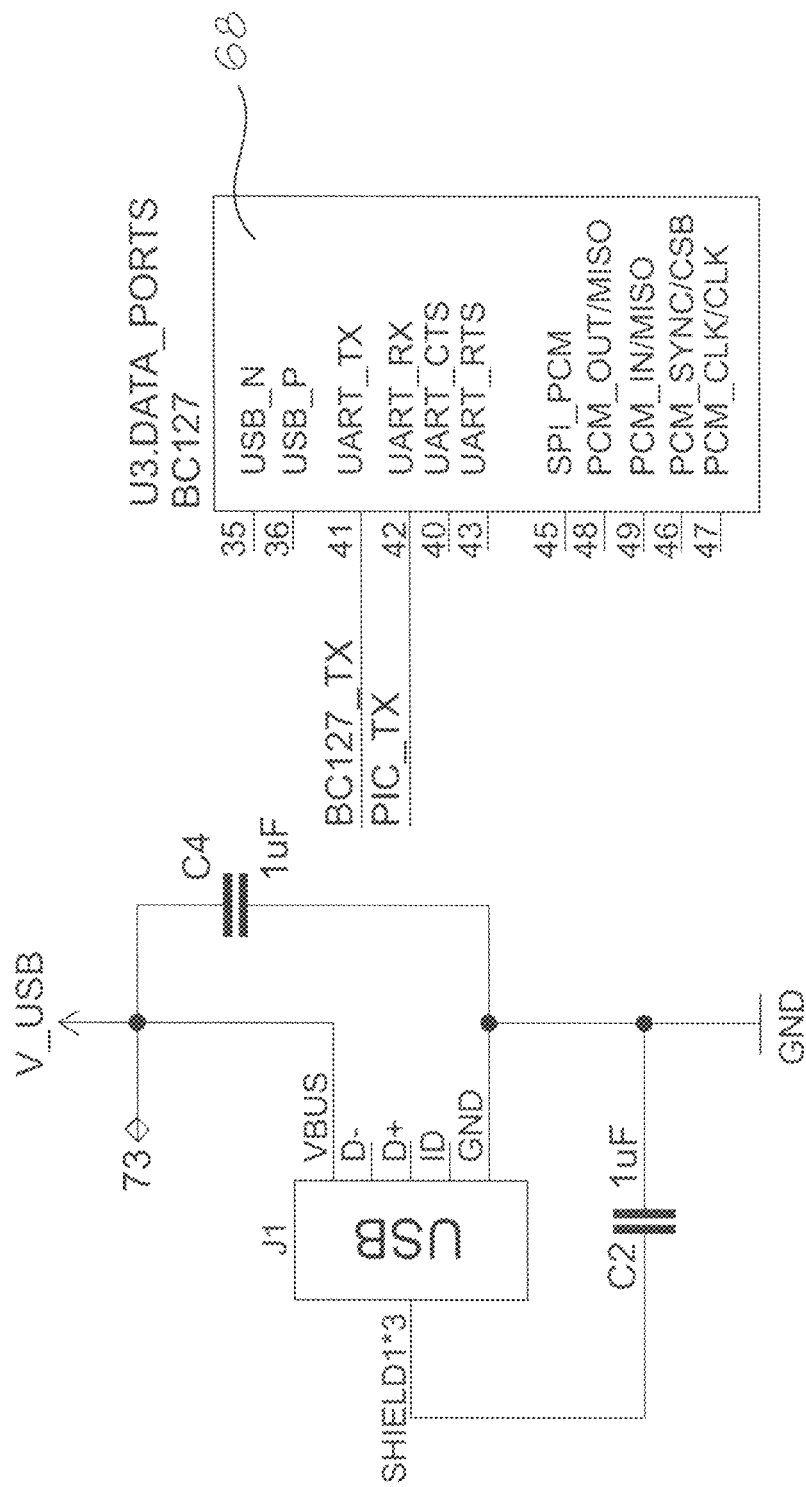
FIG. 7H is a circuit line diagram to illustrate a portion of the internal electronic components and connections in a customizable lapel pin containing a micro communication device according to a preferred embodiment of the invention.

As shown in FIG. 7H, USB power controller 68 and related circuitry is a portion of USB power controller 52 from FIG. 3. In this embodiment, the Bluetooth module provides the USB serial subsection and external USB data communications.

As shown in FIG. 7I, LED controller 69 and related circuitry works with LED management portion 61 from FIG. 7A to feed power to LED 48 from FIG. 3. This provides a discrete power indicator, battery voltage divider for simple battery level measurement, and various test points.

All of these circuits are installed on board 40 as shown in FIG. 6 in the configurations discussed previously. The combination of FIGS. 7A to 7I illustrate one embodiment for the electronic circuitry and various connections but do not limit the invention, which is capable of operation in a variety of configurations.

Figure 8:
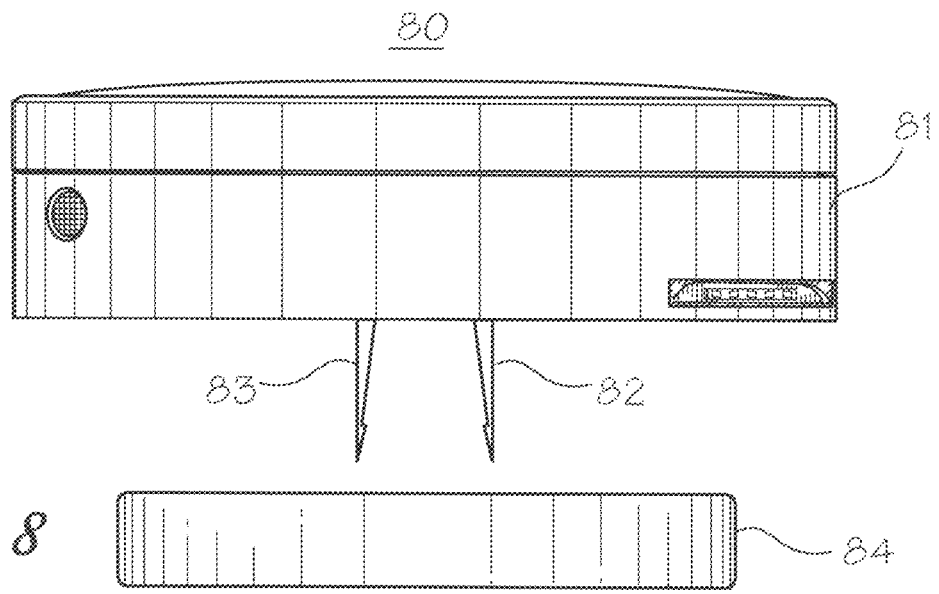
FIG. 8 is an isometric view of another embodiment of the invention, illustrating two connection elements and an external power source.

FIG. 8 provides a view of another preferred embodiment of the invention, where there are two connection elements and an external power source. Here lapel pin 80 comprises two connection elements 82 and 83 for affixing housing 81 to a surface. These connection elements also act as positive and negative terminals to transmit power from external power source 84, which also acts as a clasp to assist in affixing housing 81 to a surface.

The benefit of the embodiment of FIG. 8 is that it allows a much smaller housing 81 to be used without the additional space involved with an internal power source as shown in other configurations above. In other words, the battery is no longer inside housing 81 and is now moved externally to power source 84, which could house a standard battery or could itself be a specially designed battery that could serve as power source 84 to significantly reduce the size of housing 81.

Figure 9:
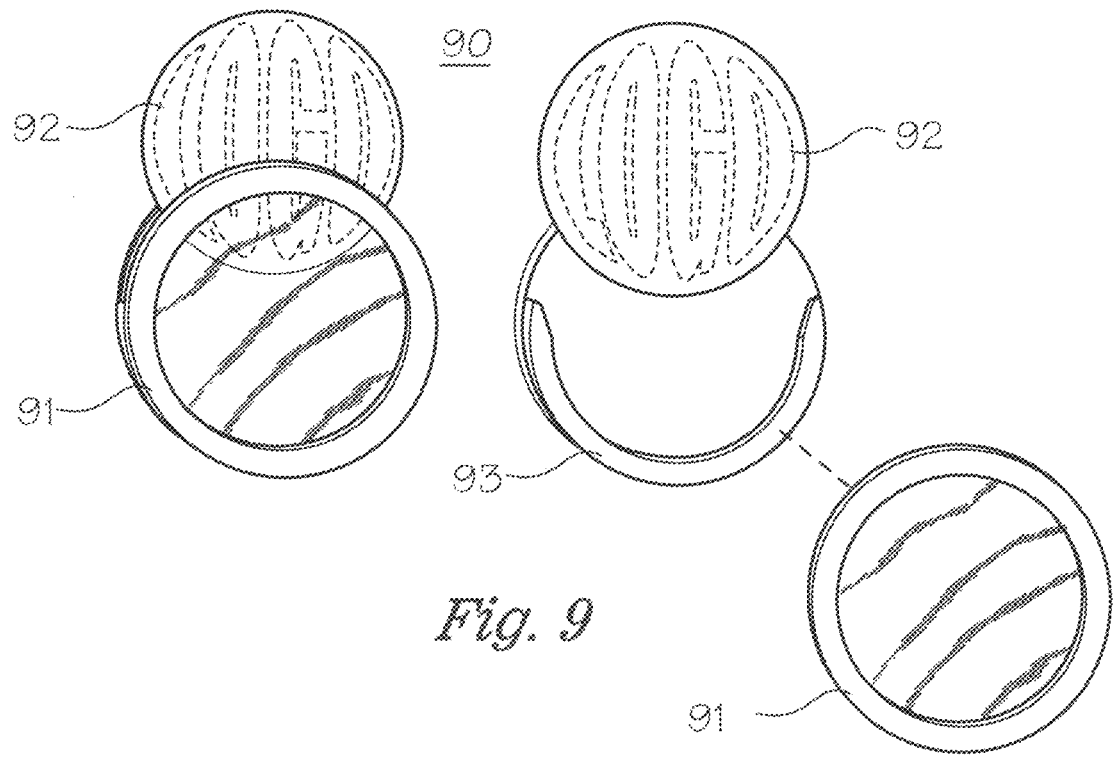
FIG. 9 is an isometric view another embodiment of the invention, where the cover is detachable and a customizable logo is insertable behind the cover.

FIG. 9 provides a view of another embodiment of the invention, where the cover is detachable and a customizable logo is insertable behind the cover. In this embodiment, lapel pin cover 90 is comprised of detachable outer cover 91 and inner cover 93. As is illustrated, outer cover 91 may be detached from inner cover 93. In this embodiment, outer cover 91 is transparent; but outer cover 91 could also be used to provide another surface with a printed image if desired.

Insert 92 is also provided to allow a user to easily insert identifiers such as company logos into cover 90. In one embodiment, insert 92 is a front printed logo. In another embodiment, insert 92 is a transparent, rear-printed (reverse) logo. In yet another embodiment, insert 92 could be a simple piece of properly shaped and sized paper or cardboard if the user desires.

In each of the embodiments of FIG. 9, inner cover 91 is affixable to a lapel pin as earlier described herein. When the embodiment of FIG. 9 is used as described with reference to other covers hereinabove, inner cover 91 attaches in such a manner that it may move up and down to activate a power switch. In another embodiment (not pictured), the power switch could be moved to another location so that it is externally accessible.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A method of using a customizable lapel pin communication device, said method comprising the steps of:
    providing a lapel pin housing comprising therein:
        a microphone;
        a speaker;
        a power source;
        a power switch; and
        a controller for receiving audio from said microphone and transmitting audio to said speaker;
    providing a lapel pin cover comprising therein a customized image, wherein said lapel pin cover is sized to fit snugly over said lapel pin housing;
    affixing said lapel pin cover over said lapel pin housing to join said lapel pin cover to said lapel pin housing;
    affixing said lapel pin to a surface;
    pressing the outer portion of said lapel pin cover to engage said power switch;
    receiving audio from said microphone; and
    transmitting said audio to an external receiver.

2. The method of using a customizable lapel pin communication device of claim 1 further comprising the step of connecting an external power source, wherein said external power source also operates to assist in affixing said customizable lapel pin communication device to a surface.

3. The method of using a customizable lapel pin communication device of claim 1 further comprising the step of receiving audio data from an external receiver and playing said audio data on said speaker.

4. The method of using a customizable lapel pin communication device of claim 1 further comprising the step of attaching a charger to said customizable lapel pin communication device to charge said power source.

5. The method of using a customizable lapel pin communication device of claim 1 further comprising the step of attaching an external cable to said customizable lapel pin communication device to transmit data to said customizable lapel pin communication device.

6. The method of using a customizable lapel pin communication device of claim 1 further comprising the step of attaching an external cable to said customizable lapel pin communication device to receive data from said customizable lapel pin communication device.

7. The method of using a customizable lapel pin communication device of claim 1 further comprising the step of providing a lapel pin housing further comprising therein a video recorder.

8. The method of using a customizable lapel pin communication device of claim 1 further comprising the step of charging said power source using an external wired charger or an external wireless charger.

9. A customizable lapel pin comprising:
    an inner housing comprising therein:
        an audio recording portion;
        a video recording portion; and
        a communication portion for transmitting said audio recording portions and said video recording portions;
    a detachable outer housing comprising an outer cover for use both as a lapel pin cover and as a power control activation for said audio recording portion, said video recording portion, and said communication portion;

a first connection element for use in connecting the lapel pin to a surface;
a cover designed to securely fit over said outer cover to contain a swappable customized image for use as the visual portion of the lapel pin; and
a second connection element for use in connecting the lapel pin to a surface, wherein said first connection element for use in connecting the lapel pin to a surface and said second connection element for use in connecting the lapel pin to a surface together transmit power from a power source to said customizable lapel pin.

* * * * *